United States Patent
Masuko et al.

(10) Patent No.: US 10,331,730 B2
(45) Date of Patent: Jun. 25, 2019

(54) ATTRIBUTE DISPLAY SYSTEM, ATTRIBUTE DISPLAY METHOD, AND ATTRIBUTE DISPLAY PROGRAM

(71) Applicant: Rakuten, Inc., Tokyo (JP)

(72) Inventors: Soh Masuko, Tokyo (JP); Enkhbat Davaasuren, Tsukuba (JP); Shigaku Iwabuchi, Tokyo (JP); Jiro Tanaka, Tsukuba (JP)

(73) Assignee: Rakuten, Inc., Tokyo (JP)

( * ) Notice: Subject to any disclaimer, the term of this patent is extended or adjusted under 35 U.S.C. 154(b) by 180 days.

(21) Appl. No.: 15/113,465

(22) PCT Filed: Jan. 30, 2014

(86) PCT No.: PCT/JP2014/052148
§ 371 (c)(1),
(2) Date: Jul. 22, 2016

(87) PCT Pub. No.: WO2015/114785
PCT Pub. Date: Aug. 6, 2015

(65) Prior Publication Data
US 2017/0011067 A1 Jan. 12, 2017

(51) Int. Cl.
*G06F 17/30* (2006.01)
*G06F 16/583* (2019.01)
*G06F 16/51* (2019.01)
*G06F 16/54* (2019.01)
(Continued)

(52) U.S. Cl.
CPC .......... *G06F 16/5838* (2019.01); *G06F 16/20* (2019.01); *G06F 16/24578* (2019.01);
(Continued)

(58) Field of Classification Search
CPC .......... G06F 17/30256; G06F 17/3053; G06F 17/3028; G06F 17/30277; G06F 17/30274;
(Continued)

(56) References Cited

U.S. PATENT DOCUMENTS 6,032,157 A * 2/2000 Tamano ............ G06F 17/30241
8,390,648 B2 * 3/2013 Ptucha .................... G06T 11/60
345/638

(Continued)

FOREIGN PATENT DOCUMENTS

JP 2002183593 A 6/2002
JP 2002297661 A 10/2002
(Continued)

OTHER PUBLICATIONS

International Preliminary Report on Patentability issued from the International Bureau in counterpart International application No. PCT/JP2014/052148, dated Aug. 11, 2016.
(Continued)

*Primary Examiner* — Greta L Robinson
(74) *Attorney, Agent, or Firm* — Sughrue Mion, PLLC

(57) ABSTRACT

An attribute display system includes an acquisition means configured to acquire specifying information that specifies a plurality of images selected by a user from among a plurality of images presented to the user, each of the plurality of presented images being associated with attributes being text information depicting appearance shown in the images, a counting means configured to acquire attributes associated with the images specified by the specifying information and count images associated with the acquired attributes, and a display control means configured to display frequency information indicating magnitude of counts for at least a plurality of attributes with larger counts among the attributes for which the number of images is calculated by the counting means.

8 Claims, 14 Drawing Sheets

(51) Int. Cl.
*G06F 16/532* (2019.01)
*G06F 16/2457* (2019.01)
*G06Q 30/02* (2012.01)
*G06F 16/20* (2019.01)
*G06F 3/0482* (2013.01)
*G06T 11/20* (2006.01)

(52) U.S. Cl.
CPC ............ *G06F 16/51* (2019.01); *G06F 16/532* (2019.01); *G06F 16/54* (2019.01); *G06Q 30/0204* (2013.01); *G06F 3/0482* (2013.01); *G06T 11/206* (2013.01)

(58) Field of Classification Search
CPC ............ G06F 17/30286; G06F 3/0482; G06F 16/5838; G06F 16/20; G06F 16/24578; G06F 16/532; G06F 16/54; G06F 16/51; G06Q 50/10; G06Q 30/0204; G06T 11/206
See application file for complete search history.

(56) References Cited

U.S. PATENT DOCUMENTS

| | | | |
|---|---|---|---|
| 2002/0052805 A1* | 5/2002 | Seki | ........................ G06Q 30/02 705/27.2 |
| 2005/0015313 A1 | 1/2005 | Eto | |
| 2007/0094611 A1 | 4/2007 | Sasaki | |
| 2009/0234716 A1* | 9/2009 | Mallick | .................. G06F 3/0482 705/14.54 |
| 2009/0254547 A1 | 10/2009 | Hirota | |
| 2012/0296895 A1* | 11/2012 | Robinson | .......... G06F 17/30687 707/723 |
| 2013/0083049 A1 | 4/2013 | Mizuno | |
| 2014/0207608 A1* | 7/2014 | Leupke | .................. G06Q 50/10 705/26.5 |

FOREIGN PATENT DOCUMENTS

| | | |
|---|---|---|
| JP | 2004362314 A | 12/2004 |
| JP | 200538302 A | 2/2005 |
| JP | 200672580 A | 3/2006 |
| JP | 2007115180 A | 5/2007 |
| JP | 2009251934 A | 10/2009 |
| JP | 201377136 A | 4/2013 |

OTHER PUBLICATIONS

International Search Report, issued by International Searching Authority in corresponding International Application No. PCT/JP2014/052148, dated Apr. 15, 2014.

* cited by examiner

Fig. 5

| IMAGE ID | ATTRIBUTE | | | | | PROVISION STORE |
|---|---|---|---|---|---|---|
| | LENGTH | TASTE | HAIRCUT | STYLE | COLOR | |
| 001 | LONG | ELEGANCE | ONE LENGTH | DOWN | BROWN | AAA |
| 002 | SEMI LONG | NATURAL | STRAIGHT | BRAID | MAT | BBB |
| 003 | SHORT | COOL | MUSHROOM | — | GOLD | CCC |
| 004 | LONG | GLAMOROUS | GRADATION | PERM | BEIGE | DDD |
| 005 | MEDIUM | CONSERVATIVE | AIRY | — | BLACK | EEE |
| ... | ... | ... | ... | ... | ... | ... |

Fig.7

| ATTRIBUTE | FREQUENCY |
|---|---|
| BROWN | 4 |
| NATURAL | 4 |
| LONG | 4 |
| AIRY | 4 |
| DOWN | 3 |
| CURL | 2 |
| OTHER | 2 |
| FEMININE | 1 |
| CONSERVATIVE | 1 |
| GLAMOROUS | 1 |
| PINK | 1 |
| MEDIUM | 1 |

*Fig.10*

| ATTRIBUTE | FREQUENCY |
|---|---|
| BROWN | 4 |
| NATURAL | 3.7 |
| LONG | 3 |
| AIRY | 2.5 |
| CURL | 2 |
| OTHER | 1.5 |
| ⋮ | ⋮ |

ATTRIBUTE DISPLAY SYSTEM, ATTRIBUTE DISPLAY METHOD, AND ATTRIBUTE DISPLAY PROGRAM

CROSS REFERENCE TO RELATED APPLICATIONS

This application is a National Stage of International Application No. PCT/JP2014/052148 filed Jan. 30, 2014, the contents of which are incorporated herein by reference in their entirety.

TECHNICAL FIELD

One aspect of the present invention relates to an attribute display system, an attribute display method, and an attribute display program.

BACKGROUND ART

A system that searches for objects desired by a user and presents them to the user has been used. In such a system, searches are made based on attributes indicating features of objects. As such a system, a system for hairdressers to search for hairstyles desired by clients is known (for example see Patent Literature 1). In this system, when search criteria such as a hair length, a hair color and a style are entered, images of hairstyles that match the criteria are retrieved from a database, and the retrieved images are displayed as a list. In this system, attributes such as a hair length, a hair color and a style are tagged in advance to each of images stored in the database, and the images having the attributes that match the entered criteria are retrieved and displayed.

CITATION LIST

Patent Literature

PTL 1: Japanese Unexamined Patent Application Publication No. 2005-38302

SUMMARY OF INVENTION

Technical Problem

In the existing system, attributes that are entered as search criteria and attributes that are attached in advance to hairstyle images are linguistic expressions (text information) of the feelings which persons who looked at actual hairstyles or hairstyle images had. Therefore, attributes attached to the same hairstyle vary from one another. For example, when persons look at a hairstyle with the same length, some of them think that the hair is long, and others think that the hair is medium. As a result, there are variations in both of attributes attached in a database and attributes entered as search criteria, and it is thus difficult to specify a hairstyle desired by a user and extract the images of hairstyles that match the desired hairstyle. Such tendency applies not only to the case of searching for hairstyle images but also to the case of attaching attributes that depict appearance of an image or an object in an image by text information or entering such attributes as search criteria.

In view of the foregoing, an object of one aspect of the present invention is to provide a system capable of presenting a user with the tendency of attributes depicting appearance shown in an image by text information.

Solution to Problem

To solve the above problem, an attribute display system according to one aspect of the present invention includes an acquisition means configured to acquire specifying information that specifies a plurality of images selected by a user from among a plurality of images presented to the user, each of the plurality of presented images being associated with attributes being text information depicting appearance shown in the images, a counting means configured to acquire attributes associated with the images specified by the specifying information and count images associated with the acquired attributes, and a display control means configured to display frequency information indicating magnitude of counts for at least a plurality of attributes with larger counts among the attributes for which the number of images is calculated by the counting means.

An attribute display method according to one aspect of the present invention is an attribute display method performed by a computer, the method including an acquisition step of acquiring specifying information that specifies a plurality of images selected by a user from among a plurality of images presented to the user, each of the plurality of presented images being associated with attributes being text information depicting appearance shown in the images, a counting step of acquiring attributes associated with the images specified by the specifying information and counting images associated with the acquired attributes, and a display control step of displaying frequency information indicating magnitude of counts for at least a plurality of attributes with larger counts among the attributes for which the number of images is calculated in the counting step.

An attribute display program according to one aspect of the present invention causes a computer to implement an acquisition function to acquire specifying information that specifies a plurality of images selected by a user from among a plurality of images presented to the user, each of the plurality of presented images being associated with attributes being text information depicting appearance shown in the images, a counting function to acquire attributes associated with the images specified by the specifying information and count images associated with the acquired attributes, and a display control function to display frequency information indicating magnitude of counts for at least a plurality of attributes with larger counts among the attributes for which the number of images is calculated by the counting function.

According to the above-described aspects, attributes attached to images selected by a user from among a plurality of presented images are acquired, and images associated with those attributes are counted. Then, the magnitude of the counts for a plurality of attributes is shown, and it is thereby possible to present the user with the tendency of the attributes depicting appearance shown in the image by text information.

In the attribute display system according to another aspect, the display control means may display the frequency information by associating attributes in the frequency information and images having the attributes with each other.

According to this aspect, it is possible to allow a user to recognize the attributes associated with the images selected by the user and the frequency of each of those attributes in the selected images. It is thereby possible to present the attributes that are associated only with some of the selected images in a manner that the images associated with those attributes are evident.

In the attribute display system according to another aspect, the display control means may display association between the attributes in the frequency information and the images using lines.

According to this aspect, it is possible to allow a user to visually recognize the association between the images selected by a user and their attributes.

The attribute display system according to another aspect may further include an attribute receiving means configured to receive designation of attributes of the frequency information displayed by the display control means, and an extraction/display means configured to display images having the attributes received by the attribute receiving means.

According to this aspect, because a user designates desired attributes among the attributes represented as the frequency information, the images with which those attributes are associated are displayed, and it is thereby possible to let the user view the images having the desired attributes in an exhaustive manner.

In the attribute display system according to another aspect, the extraction/display means may extract images having the attributes received by the attribute receiving means from among a plurality of images presented to a user and present only the extracted images.

According to this aspect, because the images having the attributes desired by a user are extracted and displayed from among the images already presented, it is possible to easily present the images.

The attribute display system according to another aspect may further include an image designation acquisition means configured to acquire designation of one or a plurality of images among the images displayed by the extraction/display means, and a providing means configured to display information for receiving provision of an object or a service shown in the image for which designation is acquired by the image designation acquisition means.

According to this aspect, a user can easily receive the provision of an object or a service shown in the image having the attribute desired by the user.

In the attribute display system according to another aspect, the acquisition means may acquire specifying information where a weight is set by a user for each image, and the counting means may count images associated with attributes based on the weight acquired by the acquisition means.

According to this aspect, when a user assigns a weight to appearance shown in an image and selects that image, the specifying information is acquired together with the weight, and the image associated with the attribute is counted on the basis of the acquired weight. Accordingly, the degree of a user's desire for the appearance shown in the image is suitably reflected in the display of the frequency information.

In the attribute display system according to another aspect, the display control means may display the frequency information using a figure with a size corresponding to a count for each attribute.

According to this aspect, it is possible to allow a user to visually recognize the counts for each of the attributes associated with the images selected by the user.

In the attribute display system according to another aspect, the display control means may display the frequency information using a pie chart for each attribute category.

According to this aspect, it is possible to allow a user to visually recognize the counts of the attributes associated with the images selected by the user for each category.

Advantageous Effects of Invention

According to one aspect of the present invention, it is possible to present a user with the tendency of attributes depicting appearance shown in an image by text information.

BRIEF DESCRIPTION OF DRAWINGS

FIG. 5 is a view schematically showing attribute information associated with hairstyle images.

FIG. 7 is a view showing the frequency of each attribute calculated by a calculation unit.

FIG. 10 is a view showing the frequency of each attribute.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

Figure 1:
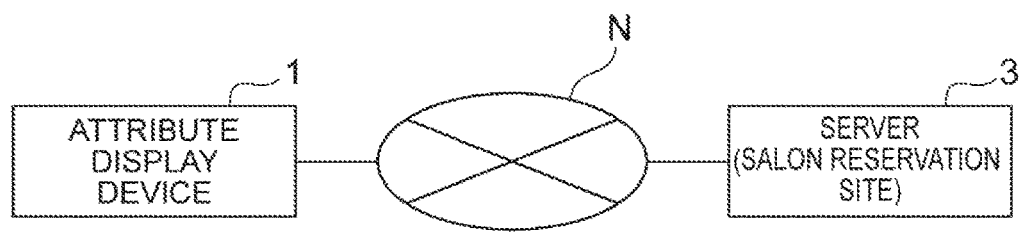
FIG. 1 is a view schematically showing a configuration related to communication of an attribute display device.

FIG. 1 is a view schematically showing a configuration related to communication of an attribute display device according to this embodiment. An attribute display device 1 (attribute display system) can communicate with a server 3 that runs a salon reservation site, for example, through a network N. The salon reservation site is a website that provides information about beauty salons, reservation services for beauty salons and the like. Various functions implemented by the attribute display device 1 are provided from a salon reservation site as an application (including a web application that runs in a browser), for example.

Figure 2:
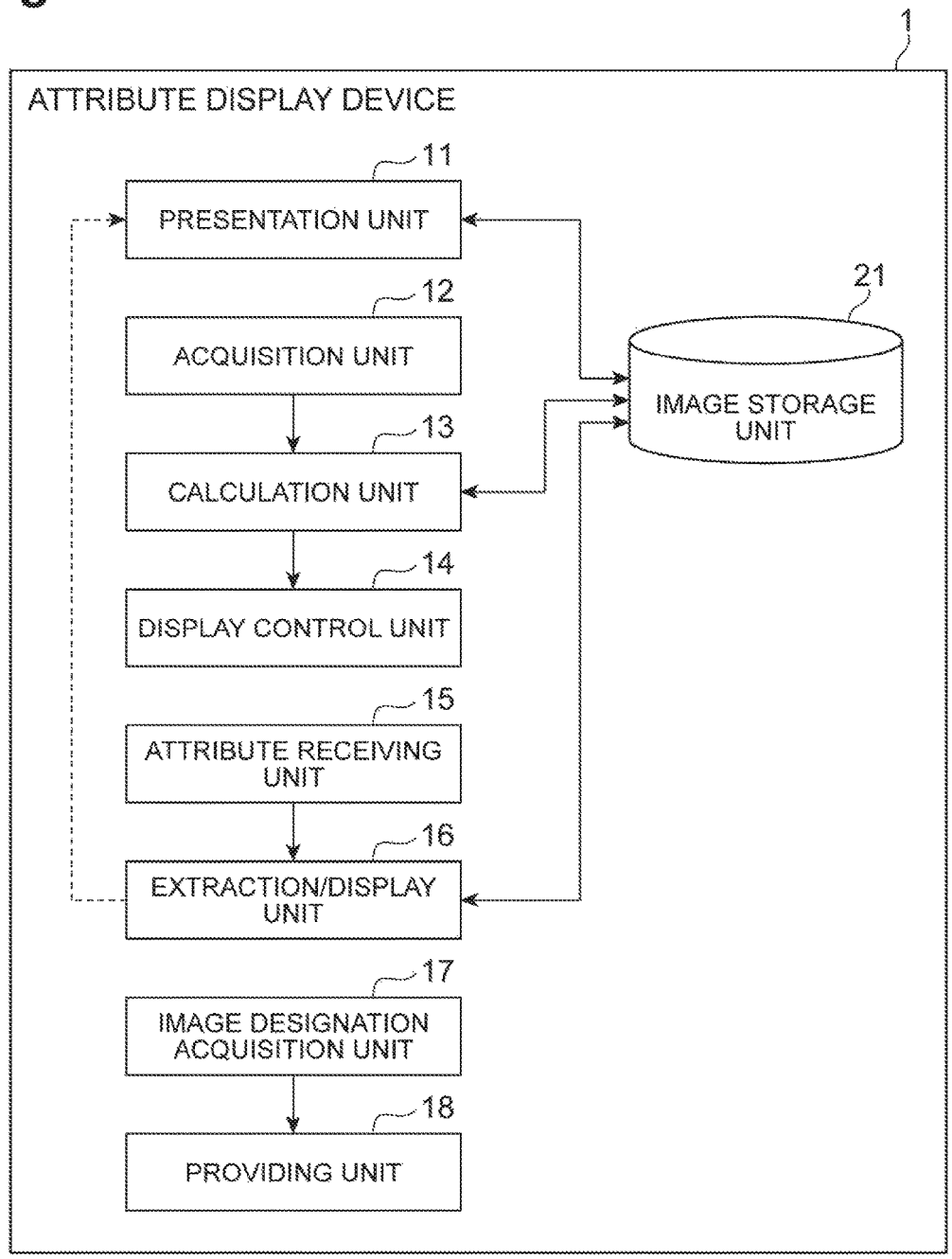
FIG. 2 is a block diagram showing a functional configuration of the attribute display device.

FIG. 2 is a block diagram showing a functional configuration of the attribute display device 1 according to this embodiment. The attribute display device 1 according to this embodiment is a device that presents a user with the tendency of attributes indicating the features of hairstyles desired by users in relation to hairstyles provided by beauty salons.

The attribute display device 1 according to this embodiment functionally includes a presentation unit 11, an acquisition unit 12 (acquisition means), a calculation unit 13 (counting means), and a display control unit 14 (display control means). The attribute display device 1 may further include an attribute receiving unit 15 (attribute receiving means), an extraction/display unit 16 (extraction/display means), an image designation acquisition unit 17 (image designation acquisition means), and a providing unit 18 (providing means). The attribute display device 1 may further include an image storage unit 21.

Note that the type of a device that constitutes the attribute display device 1 is not limited, and it may be a stationary or portable personal computer, a mobile terminal such as an advanced mobile phone (smart phone), a cellular phone or a personal digital assistant (PDA) or a dedicated terminal device, for example. Further, although the case where the functional units 11 to 18 and 21 are implemented in one attribute display device 1 is described in this embodiment, it is not limited thereto. For example, the functional units 11 to 18 and 21 may be distributed among a plurality of terminals and servers (including the server 3) that can communicate with each other to constitute one attribute display system.

Figure 3:
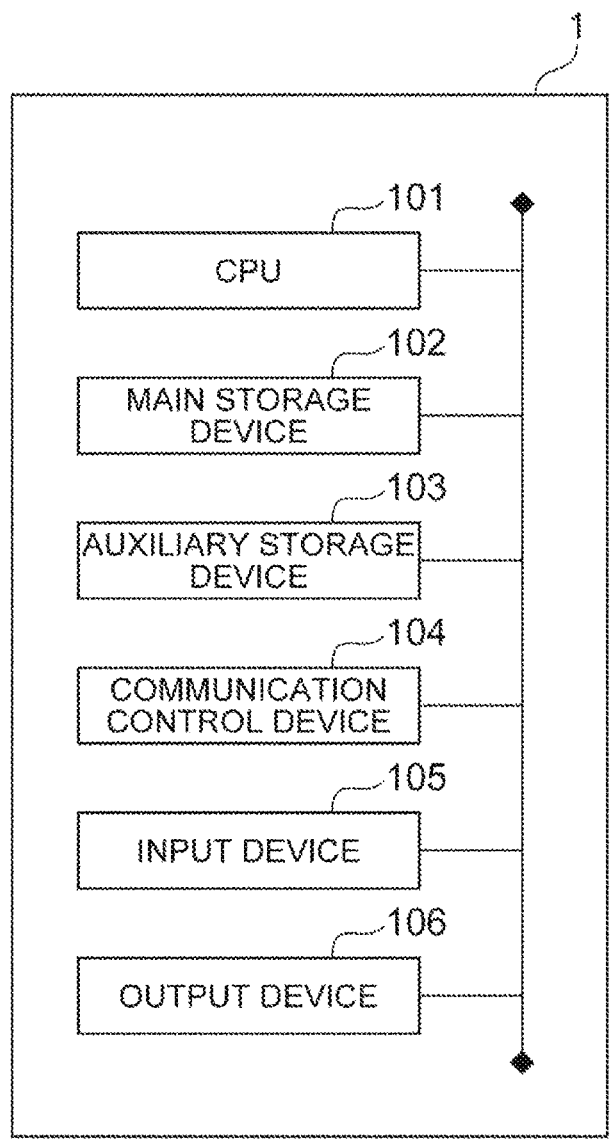
FIG. 3 is a view showing a hardware configuration of the attribute display device.

FIG. 3 is a view showing a hardware configuration of the attribute display device 1. As shown in FIG. 3, the attribute display device 1 is physically configured as a computer system that includes a CPU 101 which is a processor, a main storage device 102 such as memory like RAM and ROM, an auxiliary storage device 103 such as a hard disk, a communication control device 104 such as a network card, an input device 105 such as a keyboard and a mouse, an output device 106 such as a display and the like.

The functions shown in FIG. 2 are implemented by loading given computer software (attribute display program) onto hardware such as the CPU 101 or the main storage device 102 shown in FIG. 3, making the communication control device 104, the input device 105 and the output device 106 operate under control of the CPU 101, and performing reading and writing of data in the main storage device 102 or the auxiliary storage device 103. Data and database required for the processing is stored in the main storage device 102 or the auxiliary storage device 103.

The functional units of the attribute display device 1 are described hereinafter. The presentation unit 11 is a part that presents a plurality of images to a user. To be specific, the presentation unit 11 displays a plurality of hairstyle images in which persons in various hairstyles are shown as subjects on a display means such as a display. The hairstyle images to be presented by the presentation unit 11 are stored in the image storage unit 21, for example. The image storage unit 21 is a storage means that stores a plurality of hairstyle images acquired from the server 3. Specifically, the attribute display device 1 acquires a plurality of hairstyle images to be presented by the presentation unit 11 from the server 3 and stores them into the image storage unit 21.

Figure 4:
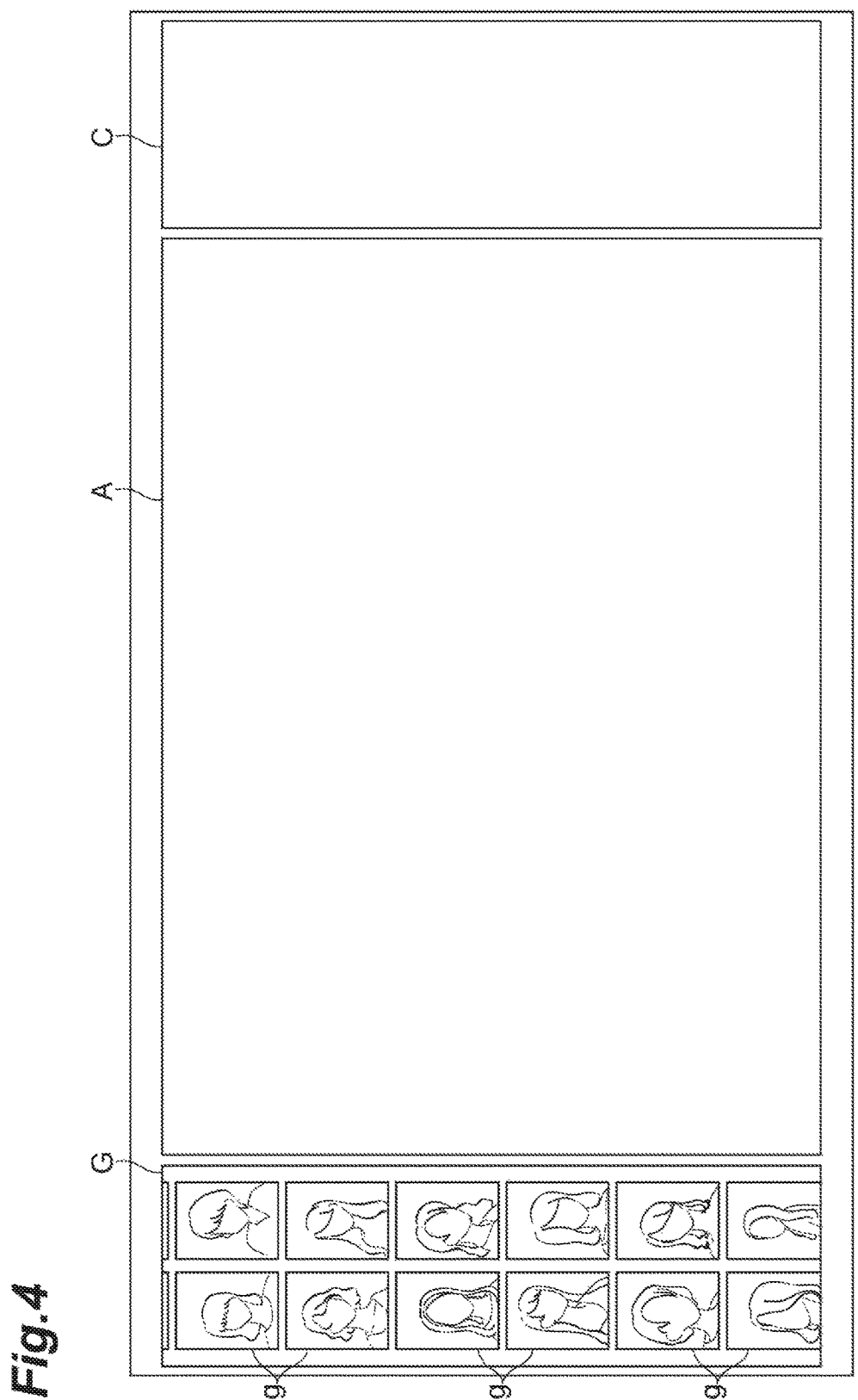
FIG. 4 is a view showing an example of a display screen in the attribute display device.

FIG. 4 is a view showing an example of a display screen in the attribute display device 1. The display screen shown in FIG. 4 includes a gallery region G, an attribute display region A and a query display region C. The gallery region C is a region to display hairstyle images g. The attribute display region A is a region to place the hairstyle images g selected by a user and display frequency information of attributes associated with the selected hairstyle images g. The attribute display region A and the query display region C are described in detail later. The query display region C is a region to display the attributes designated by a user as a query. As shown in FIG. 4, the presentation unit 11 displays a plurality of hairstyle images g acquired from the image storage unit 21 in the gallery region G.

FIG. 5 is a view schematically showing attribute information associated with each image. The attribute information is text information depicting appearance shown in an image, and it is acquired from the server 3 and stored into the image storage unit 21 just like hairstyle images. The attributes of hairstyle images include categories like Length, Taste, Haircut, Style and Color. As shown in FIG. 5, the attribute information is associated with an image ID that identifies the hairstyle image g for each category. For example, the attributes "long", "elegance", "one length", "down" and "brown" are associated with the hairstyle image with the image ID "001" as the attributes of a subject of the image. Note that, although one attribute is associated for each category in the example of FIG. 5, a plurality of attributes may be associated in one category. Further, as the attribute information, provision store information that identifies a store that has provided a hairstyle image and a beauty salon that provides the hairstyle shown in the hairstyle image may be further associated with an image ID. For example, the provision store "AAA" is associated with the image ID "001".

Figure 6:
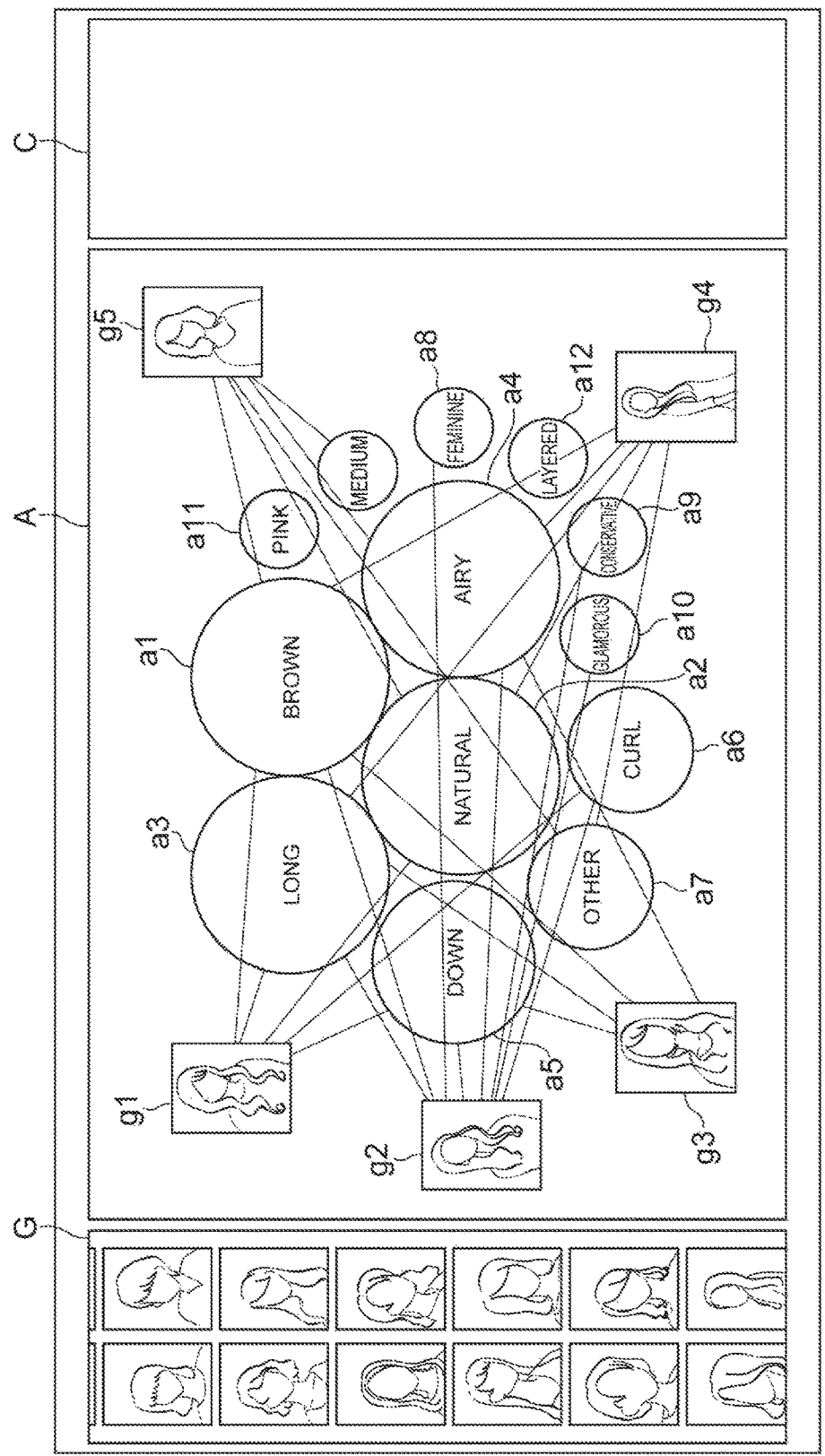
FIG. 6 is a view showing an example of a display screen where hairstyle images are selected by a user, the frequency of the attributes of the selected hairstyle images is calculated, and frequency information is displayed.

The functions of the acquisition unit 12, the calculation unit 13 and the display control unit 14 are described by referring to FIGS. 6 and 7. The acquisition unit 12 is a part that acquires specifying information that specifies a plurality of hairstyle images selected by a user among a plurality of hairstyle images presented by the presentation unit 11. The calculation unit 13 is a part that acquires the attributes associated with the hairstyle images g specified by the specifying information and counts the hairstyle images with which the acquired attributes are associated. The display control unit 14 is a part that displays frequency information indicating the magnitude of counts for at least a plurality of attributes with larger counts among the attributes for which the number of images is calculated by the calculation unit 13 on a display means such as a display, for example. FIG. 6 is a view showing an example of a display screen where hairstyle images are selected by a user, the frequency of the attributes of the selected hairstyle images is calculated, and frequency information is displayed.

To be specific, when a user first performs the operation that selects one or more hairstyle images g from a plurality of hairstyle images g displayed in the gallery region G and places them in the attribute display region A, the acquisition unit 12 acquires specifying information that identifies the hairstyle images g selected by the user. In the example shown in FIG. 6, because the user sequentially selects the hairstyle images g1 to g5 and place them in the attribute display region A, the acquisition unit 12 acquires specifying information that specifies the hairstyle images g1 to g5.

Next, the calculation unit 13 refers to the attribute information (see FIG. 5) and acquires the attributes associated with each of the hairstyle images g1 to g5. Then, the calculation unit 13 counts the number of hairstyle images associated with the acquired attributes. To be specific, when a certain attribute is associated with one hairstyle image for which the specifying information is acquired, the calculation unit 13 sets the count of that attribute as one, and adds up the counts of the attributes associated with all hairstyle images for which the specifying information is acquired, and calculates the total count as the frequency for each attribute. FIG. 7 is a view showing the frequency for each attribute calculated by the calculation unit 13. For example, in the example of FIG. 7, the frequency of the attribute "brown" among the attributes associated with the hairstyle images g1 to g5 is "4", the frequency of the attribute "natural" is "4", and the frequency of the attribute "down" is "3".

Next, the display control unit 14 displays a circle with the size corresponding to the frequency calculated by the calculation unit 13 and having text indicating the attribute inside as frequency information in the attribute display region A. As shown in FIG. 7, the frequency of the attributes "brown", "natural", "long" and "airy" is "4", which is the highest among the calculated frequencies, and therefore the display control unit 14 displays the frequency information a1, a2, a3 and a4 of those attributes with the largest circles in the attribute display region A. Further, the frequency of the attribute "down" is "3", which is the second highest to "brown" or the like, and therefore the display control unit 14 displays the frequency information a5 with the second largest circle to the frequency information a1 or the like in the attribute display region A. Further, the display control unit 14 displays the frequency information a6 to a12 of the attributes such as "curl", "other", "feminine", "conservative", "glamorous", "pink" and "medium" with the circles corresponding to the respective frequencies. By displaying the frequency information in this manner, it is possible to allow a user to visually recognize the frequency of each of the attributes that are associated with the hairstyle images g selected by the user.

Further, the display control unit 14 displays the frequency information of attributes and the hairstyle images having those attributes in association with each other. To be specific, the display control unit 14 displays the association between the frequency information a and the hairstyle image g using lines. In the example shown in FIG. 6, because the attributes "brown", "natural", "long" and "down" are associated with the hairstyle image g1, the display control unit 14 displays the hairstyle image g1 and each of the frequency information a1, a2, a3 and a5 by connecting them using lines. Likewise, the display control unit 14 displays the hairstyle images g2 to g5 and the attributes associated with each of those images by lines. In this manner, by displaying the hairstyle image g and the frequency information a in association with each other, it is possible to allow a user to visually recognize the attributes associated with the hairstyle images selected by the user and the frequency of each of those attributes in the selected images.

As described with reference to FIGS. 6 and 7, in this embodiment, instead of that the attributes that are common to all of the hairstyle images selected by a user are presented to the user, the attributes that are associated only with some of the selected hairstyle images are presented to a user. Then, all of the attributes that are associated with the hairstyle images selected by the user are presented together with the frequency information, and it is thereby possible to allow a user to recognize the tendency of the attributes of the hairstyle images selected by the user.

Note that, although the frequency of an attribute is represented by the size of a circle in the example of FIG. 6, it is not limited thereto. For example, the display control unit 14 may represent the frequency information of the attributes that belong to the same category by figures in similar colors and may represent the level of the frequency by a difference in saturation, lightness or the like.

Figure 8:
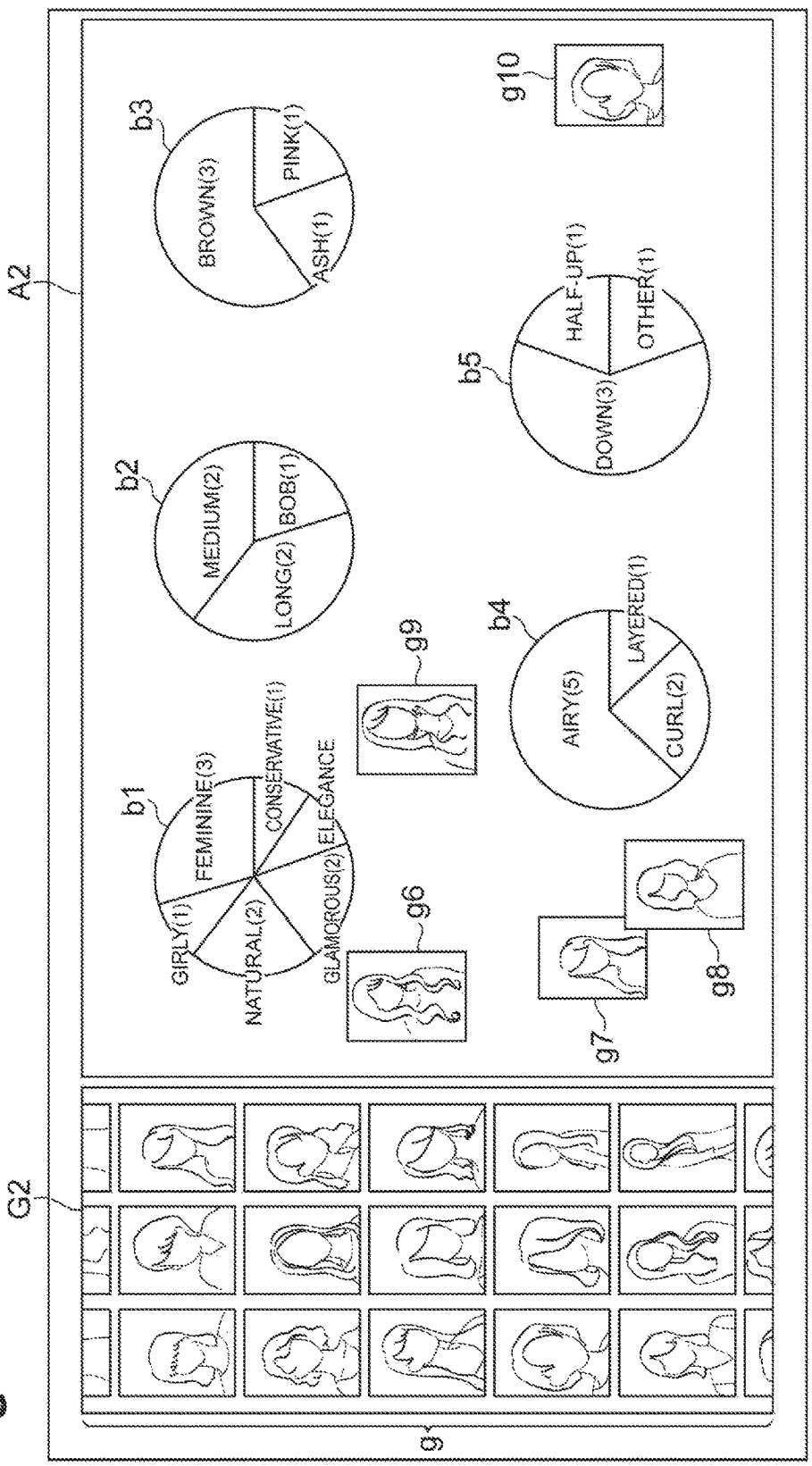
FIG. 8 is a view showing a variation of display of frequency information.

FIG. 8 is a view showing a variation of display of the frequency information shown in FIG. 6. To be specific, when a user sequentially selects hairstyle images g6 to g10 from among a plurality of hairstyle images g displayed in the gallery region G2 and places them in the attribute display region A2, the acquisition unit 12 acquires the specifying information that specifies the hairstyle images g6 to g10.

Next, the calculation unit 13 refers to the attribute information (see FIG. 5) and acquires the attributes associated with each of the hairstyle images g6 to g10. Then, the calculation unit 13 calculates the frequency of each of the acquired attributes.

Then, the display control unit 14 displays the frequency information calculated by the calculation unit 13 by a pie chart for each category of the attributes. To be specific, the display control unit 14 displays the frequency information of the attributes that belong to the attribute category "Taste" by a pie chart b1 and displays it in the attribute display region A2. The pie chart b1 shows that, among the attributes that belong to "Taste", the attribute with the highest frequency is "feminine", and its frequency is "3". Further, for the other attributes that belong to "Taste", the pie chart b1 shows that the frequency of "conservative" is "1", the frequency of "elegance" is "1", the frequency of "glamorous" is "2", the frequency of "natural" is "2", and the frequency of "curly" is "1". The display control unit 14 displays the frequency information of the attributes of the other attribute categories "Length", "Color", "Haircut" and "Style" by pie charts b2, b3, b4 and b5. By displaying the frequency information of the attributes by a pie chart for each category, it is possible to allow a user to visually recognize the frequency of the attributes that are associated with the images selected by the user for each category.

Figure 9:
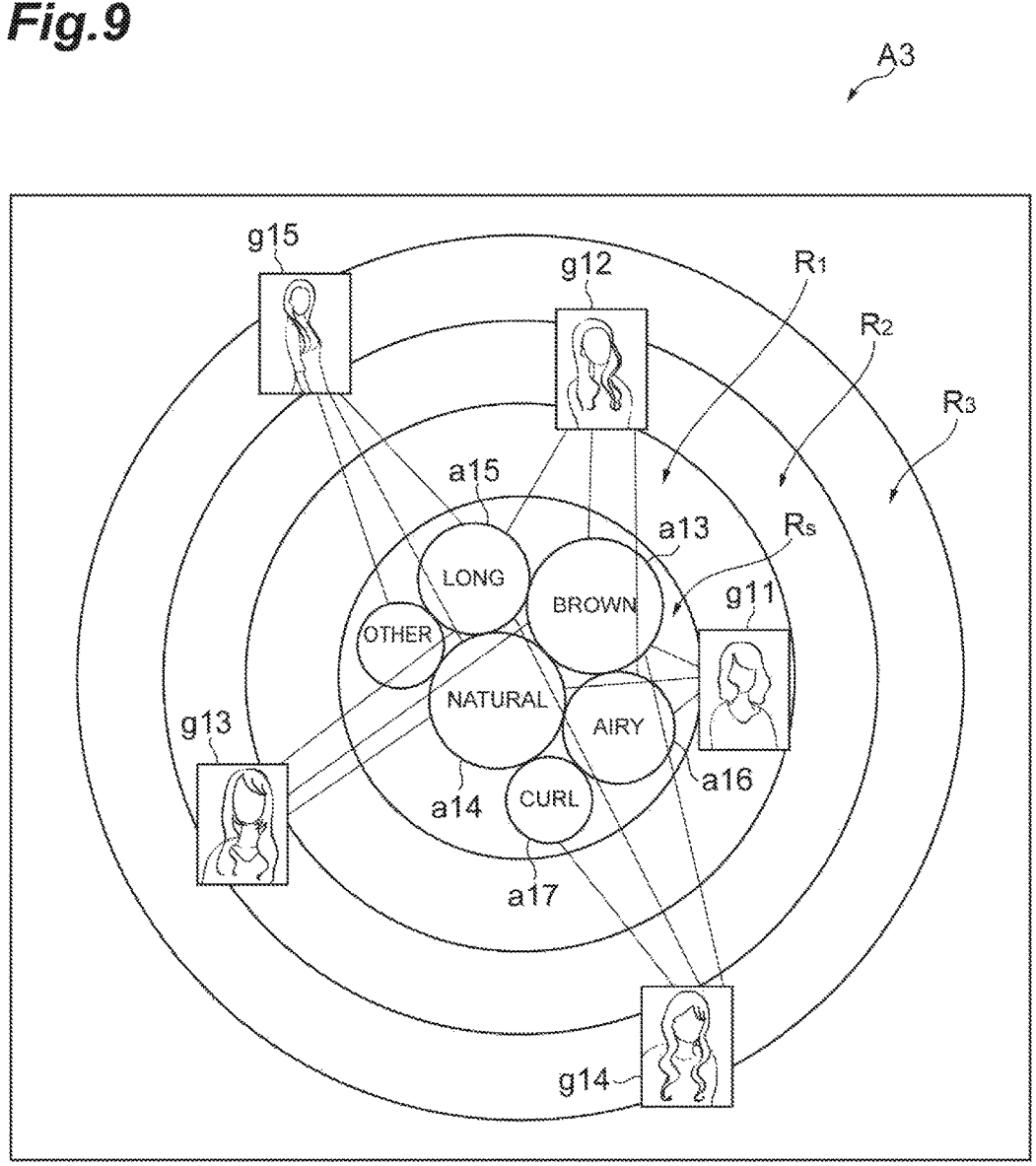
FIG. 9 is a view showing an example of a variation of acquisition of specifying information of an image and calculation of frequency of attributes and a variation of display of frequency information.

FIG. 9 is a view showing an example of a variation of acquisition of specifying information of images by the acquisition unit 12 and calculation of the frequency of attributes by the calculation unit 13, and a variation of display of the frequency information shown in FIG. 6. In this example, the acquisition unit 12 acquires the specifying information to which weights are set by a user for each hairstyle image g, and the calculation unit 13 calculates the frequency for each attribute based on the acquired weights. To be specific, a user first performs the operation that selects hairstyle images g from among a plurality of hairstyle images g displayed in the gallery region G and places them in, the attribute display region A3.

As shown in FIG. 9, the attribute display region A3 includes a frequency information display region $R_S$ and first to third image placement regions $R_1$ to $R_3$. The frequency information display region $R_S$ is a region to display the frequency information represented by circular figures. The first to third image placement regions $R_1$ to $R_3$ are regions to place the hairstyle images g in accordance with the degree that a user desires the hairstyle of a subject shown in the hairstyle image, and they are divided by concentric circles with different radii. The degree of the user's desire is associated with the distance from the center of the circle that divides the respective regions, and the first image placement region $R_1$ is a region to place an image with the highest degree of desire, the second image placement region $R_2$ is a region to place an image with the intermediate degree of desire, and the third image placement region $R_3$ is a region to place an image with a lower degree of desire.

In the example shown in FIG. 9, the hairstyle image g11 is placed in the first image placement region $R_1$, the hairstyle images g12 and g13 are placed in the second image placement region $R_2$, and the hairstyle images g14 and g15 are placed in the third image placement region $R_3$, respectively by a user. Then, a weight corresponding to a region where each image is placed is set to the specifying information that specifies each hairstyle image. This weight is a coefficient for the frequency of the attribute that is associated with the hairstyle image g, and coefficients such as 1.0, 0.7 and 0.5 are set for the frequencies of the attributes of the images placed in the first to third image placement regions $R_1$ to $R_3$, respectively, for example. The acquisition unit 12 acquires the specifying information of each hairstyle image together with the coefficient for the frequency of attributes set in accordance with the region where the image is placed.

Then, the calculation unit 13 refers to the attribute information (see FIG. 5) and acquires the attributes that are associated with each of the hairstyle images g11 to g15. The calculation unit 13 then calculates the frequency for each attribute based on the acquired attributes and the set coefficients. Specifically, in the calculation of the frequency of the attributes shown in FIG. 6, when a certain attribute is associated with one hairstyle image, the frequency of that attribute is counted as 1.0. On the other hand, in the calculation of the frequency of the attributes in the example shown in FIG. 9, the frequency of each attribute is calculated and added up by multiplying a basic value 1.0 of the frequency based on the fact that one attribute is associated with one hairstyle image by a coefficient that is set in accordance with the region where that hairstyle image is placed.

FIG. 10 is a view showing the frequency of each of the attributes calculated by the calculation unit 13. For example, in FIG. 10, the frequency of the attribute "brown" among the attributes associated with the hairstyle images g11 to g15 is "4", the frequency of the attribute "natural" is "3.7", the frequency of the attribute "long" is "3", the frequency of the attribute "airy" is "2.5", and the frequency of the attribute "curl" is "2". Then, the display control unit 14 displays the frequency information a13 to a17 that are represented by the circles with the sizes corresponding to the frequencies calculated by the calculation unit 13 in the frequency information display region $R_S$ of the attribute display region A3. Note that, although the case where weights corresponding to the degree of a user's desire are set to the regions divided by concentric circles is shown in the example of FIG. 9, it is not limited thereto. For example, weights may be set so that the degree of a user's desire becomes higher toward the right side region in the attribute display region A and weights may be set so that the degree of a user's desire becomes lower toward the left side region in the attribute display region A. In other words, weights may be set in any manner as long as weights can be assigned in accordance with regions where a user places hairstyle images.

Figure 11:
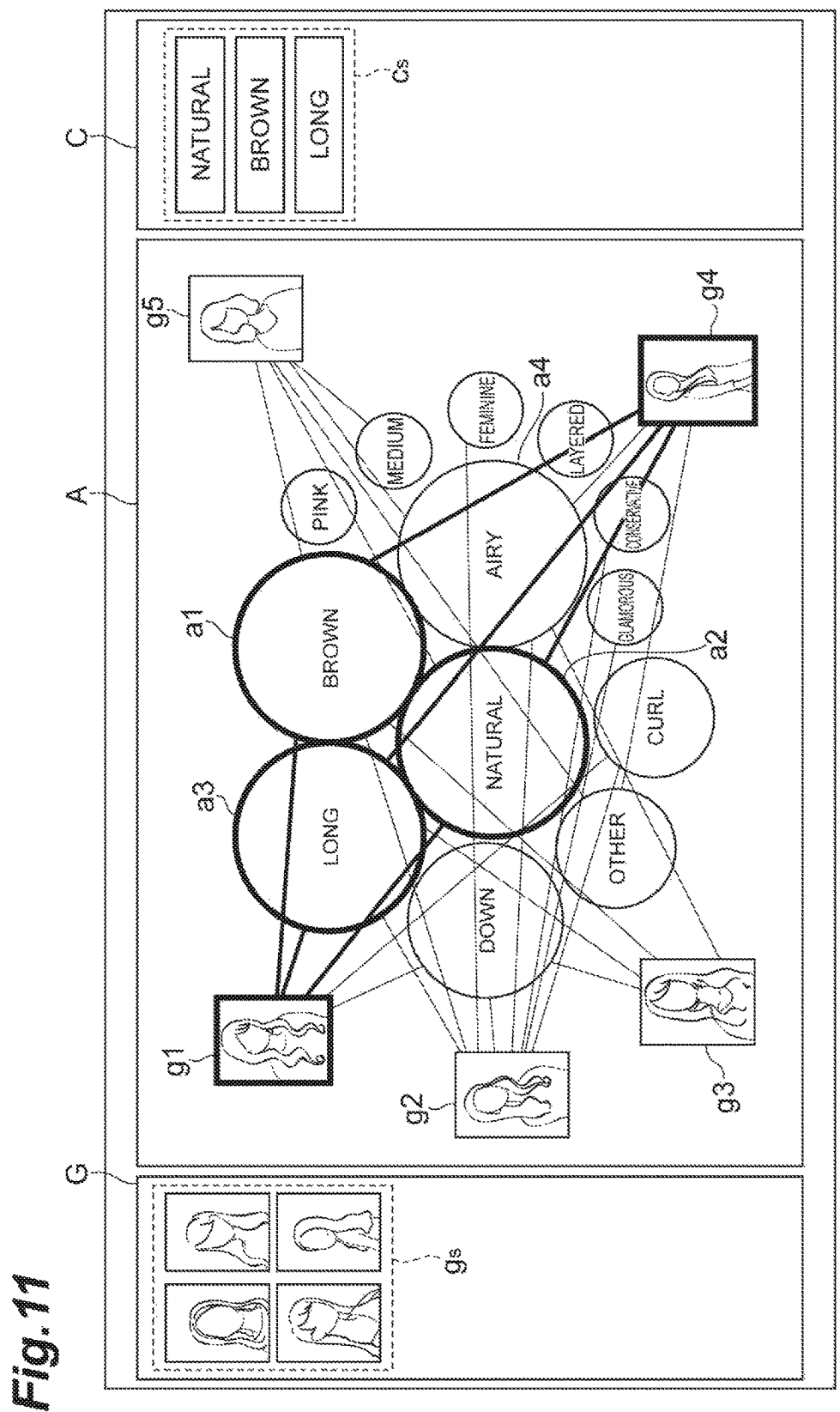
FIG. 11 is a view showing a display screen example in the state where designation of attributes by a user is received.

The functional units are further described with reference back to FIG. 2. The attribute receiving unit 15 is a part that receives designation of the attributes of the frequency information displayed by the display control unit 14. FIG. 11 is a view showing a display screen example in the state where designation of attributes by a user is received on the screen example shown in FIG. 6. In the example of FIG. 11, the attribute receiving unit 15 receives the designation of the frequency information a1 indicating the attribute "brown", the frequency information a2 indicating the attribute "natural" and the frequency information a3 indicating the attribute "long". When such designation is received, the attribute receiving unit 15 displays the designated attributes as a search query $C_S$ for extraction of images in the query display region C.

The extraction/display unit 16 is a part that displays the images having the attributes received by the attribute receiving unit 15. To be specific, the extraction/display unit 16 searches for hairstyle images using the attributes received by the attribute receiving unit 15 as a search query. When a plurality of attributes used as a search query are the attributes in different categories from one another, hairstyle images are extracted by so-called AND search where all attributes in each category are used as a query. On the other hand, when some of a plurality of attributes used as a search query are included in the same category, hairstyle images are extracted by so-called OR search for the attributes included in that category.

In the example shown in FIG. 11, the extraction/display unit 16 extracts hairstyle images having all of the attributes received by the attribute receiving unit 15 among the hairstyle images g presented in the gallery region G by the presentation unit 11 by referring to the image storage unit 21, and displays only the extracted hairstyle images $g_s$ by the presentation unit 11. Because the attributes desired by a user are thereby designated among the attributes represented as the frequency information, the hairstyle images with which those attributes are associated are displayed, and it is possible to let the user view the hairstyle images having the desired attributes in an exhaustive manner. Further, because the hairstyle images having the attributes desired by the user are extracted and displayed from among the hairstyle images already presented, it is possible to easily present the hairstyle images.

Further, the extraction/display unit 16 may highlight the hairstyle images g1 and g4 having all of the attributes received by the attribute receiving unit 15 among the hairstyle images g1 to g5 placed in the attribute display region A, and may display the other hairstyle images g2, g3 and g5 in a less visible way.

Note that, although the hairstyle images having the attributes received by the attribute receiving unit 15 are displayed in the gallery region G in the example shown in FIG. 11, they may be displayed in another region.

Figure 12:
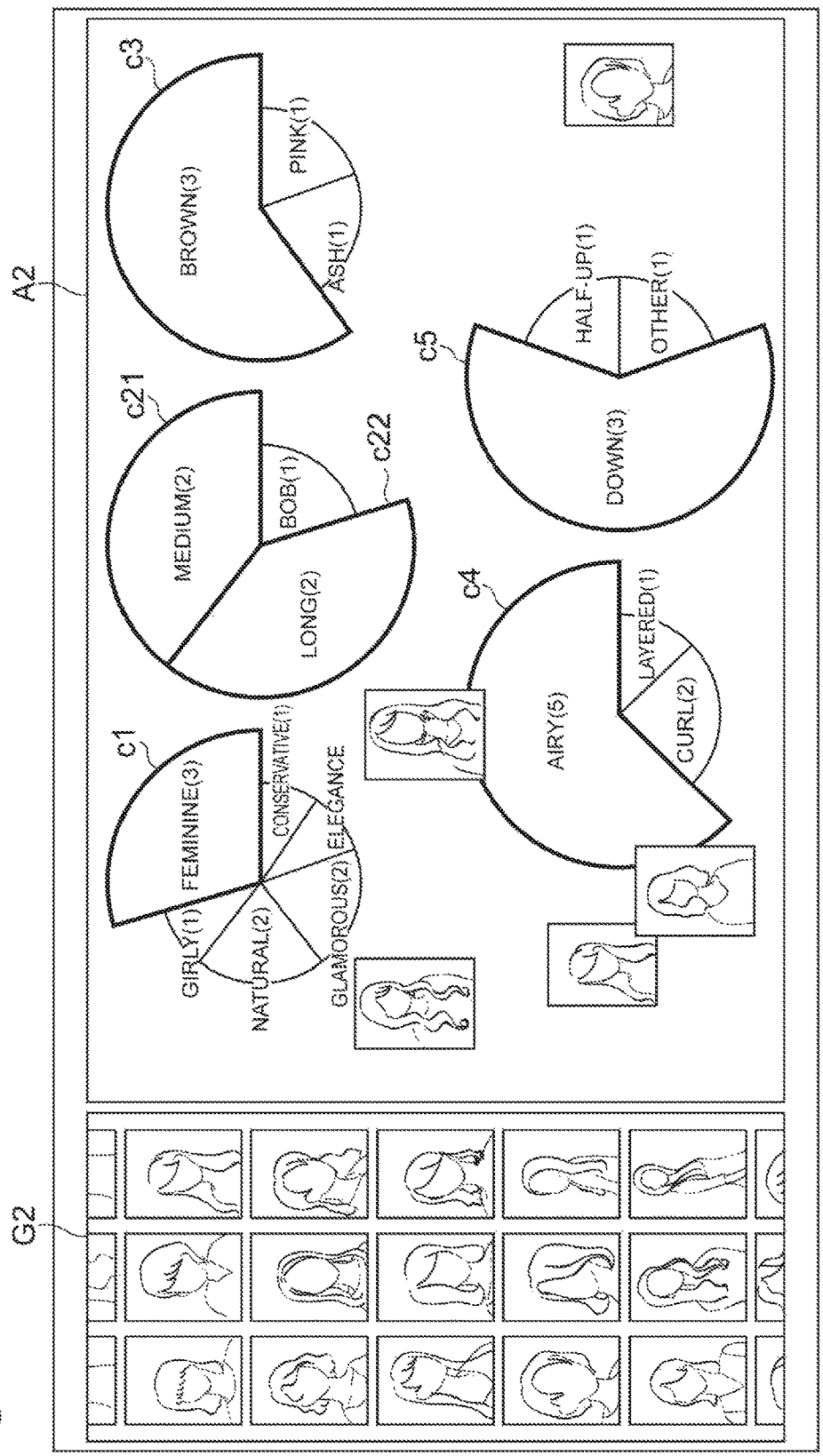
FIG. 12 is a view showing a display screen example in the state where designation of attributes by a user is received.

FIG. 12 is a view showing a display screen example in the state where designation of attributes by a user is received on the screen example shown in FIG. 8. In the example of FIG. 12, the attribute receiving unit 15 receives the designation of the frequency information c1 indicating the attribute "feminine", the frequency information c21 indicating the attribute "medium", the frequency information c22 indicating the attribute "long", the frequency information c3 indicating the attribute "brown", the frequency information c4 indicating the attribute "airy" and the frequency information c5 indicating the attribute "down" among the frequency information of the attributes represented in the pie charts for each attribute category. When such designation is received, the attribute receiving unit 15 displays the attributes of the designated frequency information c1 to c5 as a search query for extraction and display of hairstyle images by the extraction/display unit 16.

Referring back to FIG. 2, the image designation acquisition unit 17 is a part that acquires the designation of one or a plurality of images among the images displayed by the extraction/display unit 16. To be specific, the image designation acquisition unit 17 acquires the designation of the hairstyle images displayed by the extraction/display unit 16.

Further, the providing unit 18 is a part that displays information for receiving the provision of an object or a service shown in the image for which designation is acquired by the image designation acquisition unit 17 on a display means such as a display. To be specific, the providing unit 18 displays information about a store that provides the hairstyle shown in the hairstyle image for a user.

To be more specific, the image designation acquisition unit 17 receives the designation of a hairstyle image displayed by the extraction/display unit 16 from a user and acquires the image ID of the designated hairstyle image. Then, the providing unit 18 refers to the image storage unit 21 and acquires provision store information that is associated with the acquired image ID. The providing unit 18 then acquires information about the store related to the acquired provision store information from the server 3 (salon reservation site) and displays it for the user. The information to be presented to the user is store information indicating the location of the store or the like, for example. Further, the information to be presented to the user may be a reservation screen for making a reservation at the store. In this case, a user enters necessary information on the reservation screen, and the information is transmitted to the server that runs the salon reservation site, and thereby a reservation at the store can be made. In this configuration, a user can easily receive the provision of an object or a service shown in the image having the attribute desired by the user.

Figure 13:
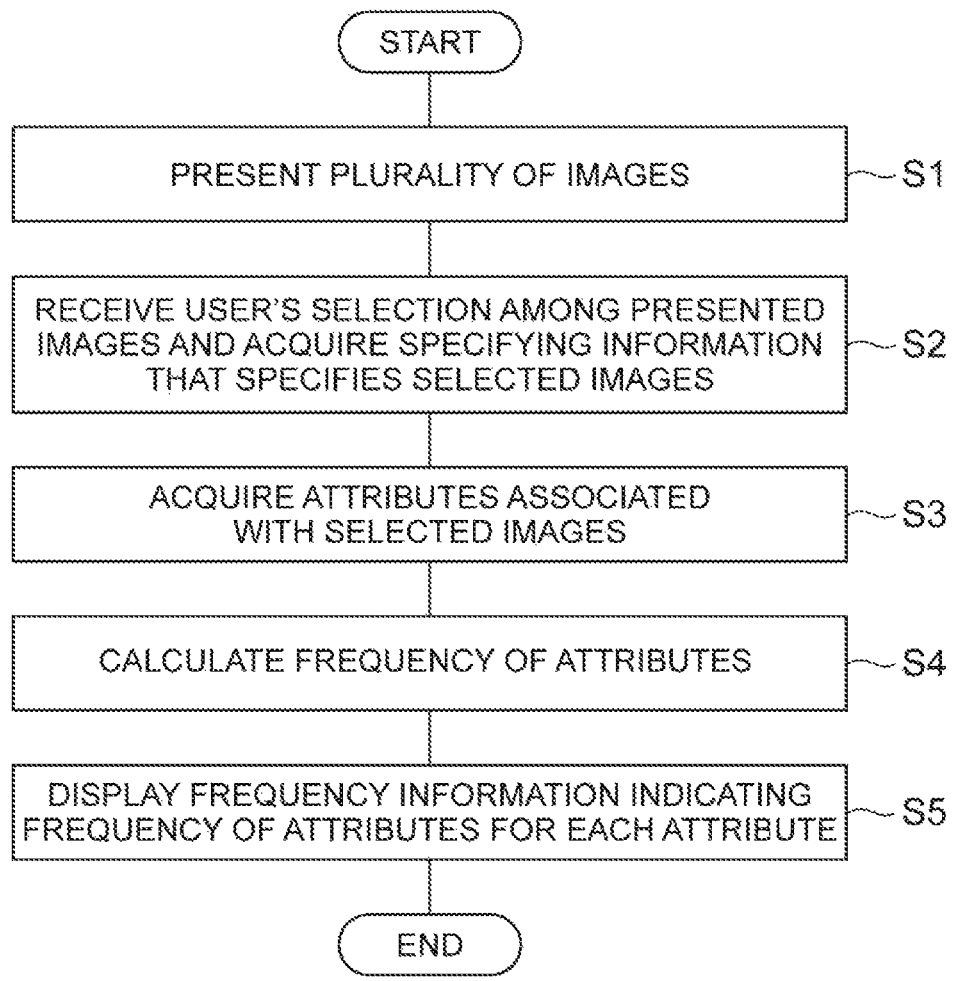
FIG. 13 is a flowchart showing an example of a process of an attribute display method in an attribute display system.

An attribute display method according to this embodiment is described hereinafter with reference to FIG. 13. FIG. 13 is a flowchart showing an example of a process of an attribute display method in the attribute display device 1 shown in FIG. 2.

First, the presentation unit 11 presents a plurality of hairstyle images to a user (S1). Next, when selection among the hairstyle images presented in Step S1 is made by a user, the acquisition unit 12 acquires specifying information that specifies the hairstyle images selected by the user (S2).

Then, the calculation unit 13 acquires the attributes that are associated with each of the hairstyle images related to the specifying information (S3). The calculation unit 13 then counts the number of images that are associated with the acquired attributes and thereby calculates the frequency for each attribute (S4).

The display control unit 14 displays frequency information indicating the frequency of the attributes calculated by the calculation unit 13 for at least a plurality of attributes with larger counts in a manner that the magnitude of the counts of those attributes is clearly shown (S5).

Figure 14:
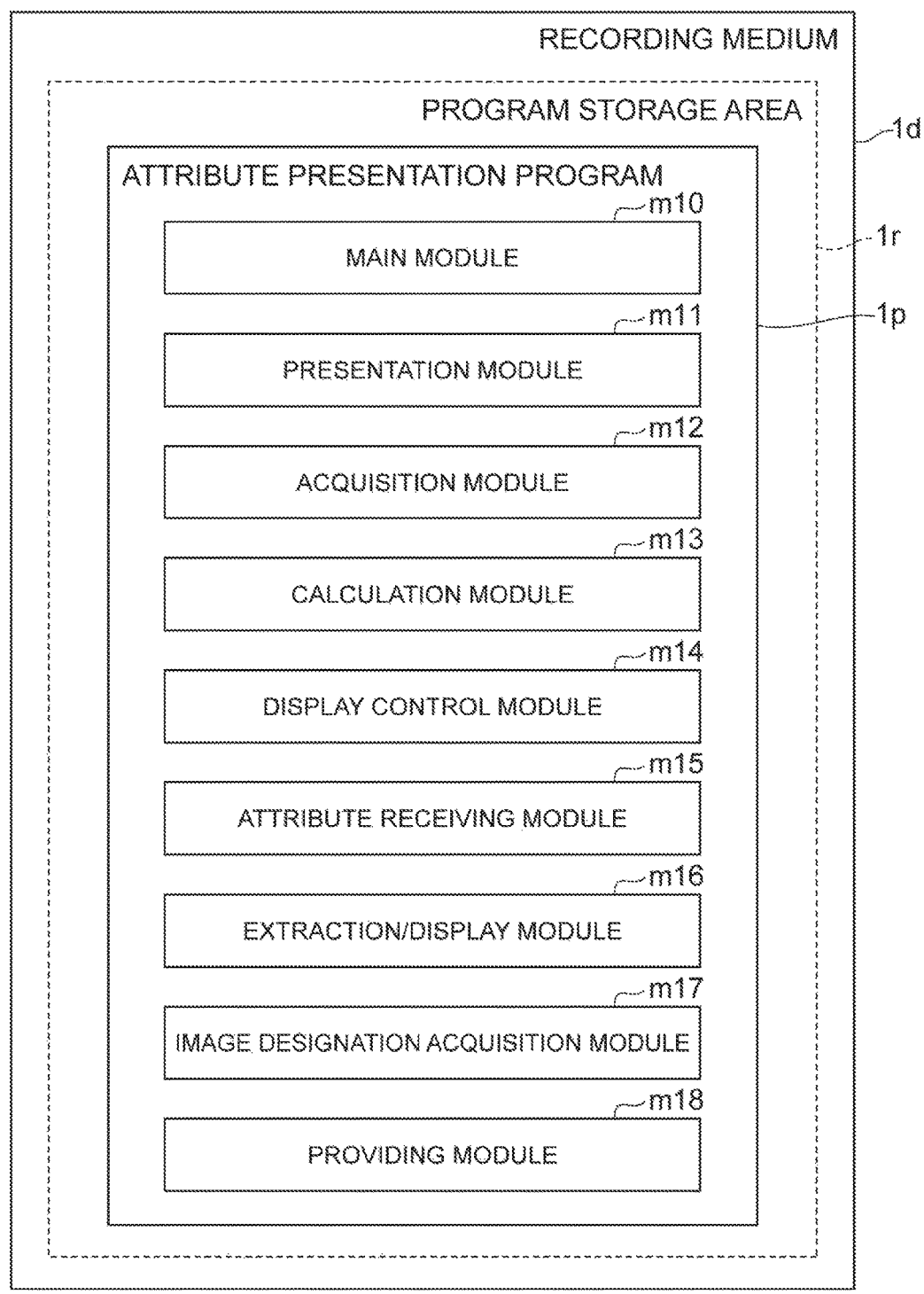
FIG. 14 is a view showing a configuration of an attribute display program.

An attribute display program that causes a computer to function as the attribute display device 1 is described hereinafter with reference to FIG. 14. An attribute display program 1*p* includes a main module m10, a presentation module m11, an acquisition module m12, a calculation module m13, a display control module m14, an attribute receiving module m15, an extraction and display module m16, an image specification acquisition module m17, and a providing module m18.

The main module m10 is a part that exercises control over the attribute display processing. The functions implemented by executing the presentation module m11, the acquisition module m12, the calculation module m13, and the display control module m14, the attribute receiving module m15, the extraction and display module m16, the image specification acquisition module m17, and the providing module m18 are equal to the functions of the presentation unit 11, the acquisition unit 12, the calculation unit 13, and the display control unit 14, the attribute receiving unit 15, the extraction/display unit 16, the image specification acquisition unit 17 and the providing unit 18 of the attribute display device 1 shown in FIG. 2.

The attribute display program 1*p* is provided by a storage medium 1*d* such as CD-ROM or DVD-ROM or semiconductor memory, for example. Further, the attribute display program 1*p* may be provided as a computer data signal superimposed onto a carrier wave through a communication network.

According to the attribute display device 1, the attribute display method and the attribute display program 1*p* described above, attributes attached to images selected by a user from among a plurality of presented images are acquired, and images associated with those attributes are counted. Then, the magnitude of the counts for a plurality of attributes is shown, and it is thereby possible to present the user with the tendency of attributes depicting appearance shown in the image by text information.

An embodiment of the present invention is described in detail above. However, the present invention is not limited to the above-described embodiment. Various changes and modifications may be made to the present invention without departing from the scope of the invention.

Although the extraction/display unit 16 searches for hairstyle images by using attributes received by the attribute receiving unit 15 as a search query and presents them to a user in the above-described embodiment, it is not limited thereto. For example, the extraction/display unit 16 may search for hairstyle images by using attributes other than a randomly selected or arbitrary attribute among a plurality of attributes received by the attribute receiving unit 15 as a search query and present them to a user. In the presentation to a user, information about a store that is the closest to the address of the user acquired in advance among stores that provide the retrieved hairstyles, for example, may be provided to the user. Further, information about a store that provides the most popular hairstyle among the retrieved hairstyles may be provided to the user.

Further, although the extraction/display unit 16 searches for hairstyle images by using attributes received by the attribute receiving unit 15 as a search query and presents them to a user in the above-described embodiment, it is not limited thereto. For example, the attribute receiving unit 15 may prompt a user to select favorite hairstyle images for each attribute category and acquire the attributes of the category associated with the selected hairstyle images, and the extraction/display unit 16 may search for hairstyle images by using the acquired attributes as a search query in that category. In this search, when one attribute is acquired for each category, the extraction/display unit 16 may extract hairstyle images by so-called AND search where all attributes in each category are used as a query, and when a plurality of attributes are acquired for one category, it may extract hairstyle images by so-called OR search for the attributes included in that category.

Furthermore, although the attribute display device 1 is described as an example of the case of presenting the tendency of attributes of a user's favorite hairstyle in the above-described embodiment, it is not limited thereto. For example, the present invention is also applicable to the case of presenting the attributes of clothes, jewelries, bags, pictures and the like. Specifically, the present invention can be applied to an object whose attributes vary due to the fact that the attributes attached to the object and the attributes to search for the object are attached by the feeling of persons who looked at the object.

REFERENCE SIGNS LIST

1 . . . attribute display device, 3 . . . server, 11 . . . presentation unit, 12 . . . acquisition unit, 13 . . . calculation unit, 14 . . . display control unit, 15 . . . attribute receiving unit, 16 . . . extraction/display unit, 17 . . . image designation acquisition unit, 18 . . . providing unit, 21 . . . image storage unit, 1*d* . . . storage medium, 1*p* . . . attribute display program, m10 . . . main module, m11 . . . presentation module, m12 . . . acquisition module, m13 . . . calculation module, m14 . . . display control module, m15 . . . attribute receiving module, m16 . . . extraction/display module, m17 . . . image designation acquisition module, m18 . . . providing module

The invention claimed is:

1. An attribute display system comprising:
    at least one memory configured to store computer program code;
    at least one processor configured to access said at least one memory and operate as instructed by said computer program code, said computer program code including:
    acquisition code configured to cause at least one of said at least one processor to acquire specifying information that specifies a plurality of images selected by a user from among a plurality of images presented to the user, each of the plurality of presented images having a corresponding plurality of appearance attributes;
    counting code configured to cause at least one of said at least one processor to acquire the corresponding appearance attributes of images specified by the specifying information and to determine, for each of the acquired appearance attributes, a number of images selected by the user that have the corresponding acquired appearance attribute;
    display control code configured to cause at least one of said at least one processor to display frequency information in association with the attributes and images having the attributes based on the number of images to which each of the acquired appearance attributes is assigned;
    attribute receiving code configured to cause at least one of said at least one processor to receive designation of attributes of the frequency information displayed; and
    extraction/display code configured to cause at least one of said at least one processor to retrieve images having the attributes received and display the retrieved images, wherein
    when an operation of placing an image in any one of a plurality of regions to which weights are assigned on a display screen is received, the acquisition code causes at least one of said at least one processor to acquire specifying information where a weight assigned to the region where the image is placed is set as the weight of the image, and the counting code causes at least one of said at least one processor to count images associated with attributes based on the weight acquired by the acquisition code.

2. The attribute display system according to claim 1, further comprising:
    image designation acquisition code configured to cause at least one of said at least one processor to acquire designation of one or a plurality of images among the retrieved images displayed by the extraction/display code; and
    providing code configured to cause at least one of said at least one processor to display information for receiving provision of an object or a service shown in the one or a plurality of images for which designation is acquired by the image designation acquisition code.

3. An attribute display method performed by a computer, comprising:
    acquiring specifying information that specifies a plurality of images selected by a user from among a plurality of images to be searched and presented to the user, each of the plurality of presented images having a corresponding plurality of appearance attributes;
    acquiring appearance attributes associated with images specified by the specifying information and determining, for each of the acquired appearance attributes, a number of images selected by the user that have the corresponding acquired appearance attribute;
    displaying frequency information in association with the attributes and images having the attributes based on the number of images to which each of the acquired appearance attributes is assigned;
    receiving designation of attributes of the frequency information displayed in the displaying step;
    retrieving images having the attributes received in the receiving step and displaying the retrieved images; and
    when an operation of placing an image in any one of a plurality of regions to which weights are assigned on a display screen is received, acquiring specifying information where a weight assigned to the region where the image is placed is set as the weight of the image, and counting images associated with attributes based on the weight.

4. A non-transitory computer-readable recording medium storing an attribute display program causing a computer to:
    acquire specifying information that specifies a plurality of images selected by a user from among a plurality of images to be searched and presented to the user, each of the plurality of presented images having a corresponding plurality of appearance attributes;
    acquire attributes associated with images specified by the specifying information and determine, for each of the acquired appearance attributes, a number of images selected by the user that have the corresponding acquired appearance attribute;
    display frequency information in association with the attributes and images having the attributes based on the number of images to which each of the acquired appearance attributes is assigned;
    receive designation of attributes of the frequency information displayed by the display control operation;
    retrieve images having the attributes received by the attribute receiving operation and display the retrieved images; and
    when an operation of placing an image in any one of a plurality of regions to which weights are assigned on a display screen is received:
        acquire specifying information where a weight assigned to the region where the image is placed is set as the weight of the image, and
        count images associated with attributes based on the weight.

5. An attribute display system comprising:
    at least one memory configured to store computer program code;
    at least one processor configured to access said at least one memory and operate as instructed by said computer program code, said computer program code including:
        acquisition code configured to cause at least one of said at least one processor to acquire specifying information that specifies a plurality of images selected by a user from among a plurality of images presented to the user, each of the plurality of presented images having a corresponding plurality of appearance attributes;
        counting code configured to cause at least one of said at least one processor to acquire the corresponding appearance attributes of images specified by the specifying information and to determine, for each of the acquired appearance attributes, a number of images selected by the user that have the corresponding acquired appearance attribute;

display control code configured to cause at least one of said at least one processor to display frequency information in association with the attributes and images having the attributes based on the number of images to which each of the acquired appearance attributes is assigned;

attribute receiving code configured to cause at least one of said at least one processor to receive designation of attributes of the frequency information displayed; and extraction/display code configured to cause at least one of said at least one processor to retrieve images having the attributes received and display the retrieved images, wherein when the user places the presented image in the specified region on a display screen:

the counting code causes at least one of said at least one processor to count images associated with the acquired attributes for each attribute based on the specifying information acquired by the acquisition code, and the display control code causes at least one of said at least one processor to display the frequency information based on the number of images counted by the counting code for each attribute.

6. The attribute display system according to claim 5, further comprising:

image designation acquisition code configured to cause at least one of said at least one processor to acquire designation of one or a plurality of images among the retrieved images displayed by the extraction/display code; and providing code configured to cause at least one of said at least one processor to display information for receiving provision of an object or a service shown in the one or a plurality of images for which designation is acquired by the image designation acquisition code.

7. A method comprising:

acquiring specifying information that specifies a plurality of images selected by a user from among a plurality of images presented to the user, each of the plurality of presented images having a corresponding plurality of appearance attributes;

acquiring the corresponding appearance attributes of images specified by the specifying information and to determine, for each of the acquired appearance attributes, a number of images selected by the user that have the corresponding acquired appearance attribute;

displaying frequency information in association with the attributes and images having the attributes based on the number of images to which each of the acquired appearance attributes is assigned;

receiving designation of attributes of the frequency information displayed;

retrieving images having the attributes received and display the retrieved images; and when the user places the presented image in the specified region on a display screen:

counting images associated with the acquired attributes for each attribute based on the specifying information, and displaying the frequency information based on the number of images counted for each attribute.

8. A non-transitory computer-readable recording medium storing an attribute display program causing a computer to:

acquire specifying information that specifies a plurality of images selected by a user from among a plurality of images presented to the user, each of the plurality of presented images having a corresponding plurality of appearance attributes;

acquire the corresponding appearance attributes of images specified by the specifying information and to determine, for each of the acquired appearance attributes, a number of images selected by the user that have the corresponding acquired appearance attribute;

display frequency information in association with the attributes and images having the attributes based on the number of images to which each of the acquired appearance attributes is assigned;

receive designation of attributes of the frequency information displayed;

retrieve images having the attributes received and display the retrieved images; and when the user places the presented image in the specified region on a display screen:

count images associated with the acquired attributes for each attribute based on the specifying information, and display the frequency information based on the number of images counted for each attribute.

* * * * *